(12) United States Patent
Yoshida

(10) Patent No.: US 7,379,264 B2
(45) Date of Patent: May 27, 2008

(54) SYSTEM AND METHOD FOR ACCESSING A CARTRIDGE CELL THAT COMPENSATES FOR MISALIGNMENT BETWEEN THE SYSTEM AND THE CELL

(75) Inventor: Tohru Yoshida, Tokyo (JP)

(73) Assignee: NEC Corporation, Tokyo (JP)

( * ) Notice: Subject to any disclaimer, the term of this patent is extended or adjusted under 35 U.S.C. 154(b) by 299 days.

(21) Appl. No.: 11/040,765

(22) Filed: Jan. 21, 2005

(65) Prior Publication Data
US 2005/0162774 A1 Jul. 28, 2005

(30) Foreign Application Priority Data
Jan. 22, 2004 (JP) ............... 2004-014419

(51) Int. Cl.
G11B 15/68 (2006.01)
(52) U.S. Cl. .................... 360/92; 369/30.38
(58) Field of Classification Search .......... 360/92; 369/53.1, 30.38–30.63
See application file for complete search history.

(56) References Cited

U.S. PATENT DOCUMENTS 5,790,338 A * 8/1998 Kanai et al. ............... 360/71
5,946,160 A * 8/1999 Ohashi ...................... 360/92

FOREIGN PATENT DOCUMENTS

| EP | 0 537 923 A2 | 4/1993 |
| EP | 0 697 695 A2 | 2/1996 |
| JP | 04-020403 | 1/1992 |
| JP | 06-251472 | 9/1994 |

OTHER PUBLICATIONS

Drapeau et al., "Striping in Large Tape Libraries", 1993, ACM 0-8186-4340-4/93/0011, pp. 378-387.
Peter Micke, "LTO-Tapetechnologie Moderne Backupstrategien mit LTO im SAN-Umfeld", lecture on Apr. 4, 2001, AK-SYS-symposium in Bommernholz.

* cited by examiner

Primary Examiner—A. J. Heinz
(74) Attorney, Agent, or Firm—Scully, Scott, Murphy & Presser, P.C.

(57) ABSTRACT

According to an embodiment, a method for accessing a cell includes: a first access step of taking out a cartridge from the cell or inserting the cartridge into the cell in an initial stop position; and a second access step of taking out the cartridge from the cell or inserting the cartridge into the cell in one or more positions in the vicinity of the initial stop position until the taking-out or insertion operation succeeds in a case where the first access step has failed.

21 Claims, 12 Drawing Sheets

US 7,379,264 B2

SYSTEM AND METHOD FOR ACCESSING A CARTRIDGE CELL THAT COMPENSATES FOR MISALIGNMENT BETWEEN THE SYSTEM AND THE CELL

BACKGROUND OF THE INVENTION

1. Field of the Invention

The present invention relates to a system and method for accessing a cell that take out/insert a cartridge from or into the cell, and more particularly, to a system and method for accessing a cell that move a picker mechanism, which is used for carrying the cartridge, to the front of a target cell among a plurality of cells arranged in a matrix form in a magazine, and then, take out a cartridge that has been inserted into the target cell and put the cartridge on the picker mechanism, or unload a cartridge that has been put on the picker mechanism and insert the cartridge into the target cell.

2. Description of the Related Art

Programs and data used in a computer are, in general, stored in a hard disk drive and transferred, as needed, from the hard disk drive to a main memory at execution time of the program. The hard disk drive is constantly at the risk of being damaged, and a given limitation is imposed on the capacity thereof. Therefore, a backup device that can store a large volume of programs and data with high reliability is required, even if the backup device operates at a low speed. As the backup device, a magneto-optical disk drive, a DVD drive, a tape drive, and the like are available. Among them, a magnetic tape drive is excellent in terms of reliability, storage capacity, and cost-performance, and a collective magnetic tape drive is used in order to back up a tremendous volume of data.

A magazine is mounted on the collective magnetic tape drive. The magazine is proved with a plurality of cells arranged in a matrix form. Each cell houses a magnetic tape cartridge (hereinafter, referred to merely as "cartridge"). An accessor mechanism including a picker mechanism takes out a cartridge required in each occasion from a cell that houses the cartridge and feeds the taken out cartridge to a tape drive. After completion of recording or reproduction operation in the tape drive, the accessor mechanism feeds the cartridge from the tape drive to the cell and inserts the cartridge into the cell.

It is necessary that the picker mechanism that carries a cartridge is correctly stopped at the front of the target cell in order to complete the taking-out/insertion operation of the cartridge from/into the target cell normally. The size of the conventional collective magnetic tape drive was comparatively large, and accordingly a distance between the adjacent cells was comparatively long, so that accuracy of the stop position of the picker mechanism has not been strictly required.

However, a high-capacity collective magnetic tape drive with a small size has been recently required. In order to obtain such a small-sized collective magnetic tape drive, the size of the magazine, which is a great factor that determines the size of the collective magnetic tape drive, must be reduced under the condition that the number of cartridges that can be housed in the collective magnetic tape drive should be equal or more than the number of cartridges in the conventional collective magnetic tape drive. Therefore, assuming that the same cartridges as used in the conventional tape drive are used, a distance between the adjacent cells must be reduced as much as possible. This accordingly requires an increase in the accuracy of the stop position of the picker mechanism relative to the cell. Even if a position control servo is used to improve the accuracy of an absolute stop position of the picker mechanism at shipment time, it is difficult to improve or maintain the accuracy of the stop position of the picker mechanism relative to the cell due to attachment errors, dimension errors, distortion, wear of movable parts, secular change and the like of mechanical parts constituting the magazine.

SUMMARY OF THE INVENTION

An object of the present invention is therefore to provide a system and method for accessing a cell capable of completing the taking-out/insertion of a cartridge from/into a cell even in a case where the stop position of the picker mechanism is misaligned relative to the target cell.

Another object of the present invention is to provide a system and method for accessing a cell capable of compensating the misalignment of the stop position of the picker mechanism relative to the target cell.

According to an aspect of the present invention, there is provided a system for accessing a cell including: a first access means for taking out a cartridge from the cell or inserting the cartridge into the cell at an initial stop position; and a second access means for taking out the cartridge from the cell or inserting the cartridge into the cell at one or more positions in the vicinity of the initial stop position until the taking-out or insertion operation succeeds at the latest in a case where the first access means has failed to complete the taking-out or insertion operation.

The above system for accessing a cell may further include an initial stop position update means for updating the initial stop position in a case where the second access means has succeeded in the taking-out or insertion operation in any of the positions in the vicinity of the initial stop position, the update means updating the initial stop position based on the position at which the access has succeeded.

The above system may further include an access cancel means for canceling the taking-out or insertion operation of the second access means in a case where the second access means has failed to complete the taking-out or insertion operation at a predetermined number of positions in the vicinity of the initial stop position.

In the above system, the one or more positions in the vicinity of the initial stop position may include four positions apart from the initial stop position in the left, right, up and down directions.

In the above system, the one or more positions in the vicinity of the initial stop position may include eight positions obtained by excluding the initial stop position from nine positions arranged in a lattice manner at which four cross-shapes intersect with each other, the centers of the four cross lines extending from each of four positions apart from the initial stop position in the left, right, up and down directions.

In the above system, at least any one of the one or more positions in the vicinity of the initial stop position may be set at the position apart from the initial stop position in a particular direction by a distance not more than the length of a normal taking-out area or normal insertion area.

In the above system, at least any one of the one or more positions in the vicinity of the initial stop position may be set at the position apart from the initial stop position in a particularly direction by a distance equal to the length of a normal taking-out area or normal insertion area.

In the above system, at least any one of the one or more positions in the vicinity of the initial stop position may be set at the position apart from the initial stop position in a particular direction by a distance equal to the half of the length of a normal taking-out area or normal insertion area.

In the above system, a difference between an initial stop position before update and updated initial stop position in a particular direction may be set to not more than the length of a normal taking-out area or normal insertion area in the particular direction.

In the above system, a difference between an initial stop position before update and updated initial stop position in a particular direction may be set to equal to the length of a normal taking-out area or normal insertion area in the particular direction.

In the above system, a difference between an initial stop position before update and updated initial stop position in a particular direction may be set to the half of the length of a normal taking-out area or normal insertion area in the particular direction.

According to the invention, even if an initial stop position has deviated from the position for the first access means to succeed in taking-out or inserting operation of a cartridge from or into a cell, the second access means can complete the taking-out or inserting operation of a cartridge from or into a cell. Therefore, even in a case where a predetermined mechanical accuracy cannot be obtained, the taking-out or insertion of a cartridge from or into a cell can succeed.

According to the present invention, it becomes more likely that the first access means succeeds in the taking-out or insertion of a cartridge from or into a cell in the next operation. This increases a possibility that eliminates a need for the second access means to perform the taking-out or insertion of a cartridge from or into a cell to reduce the time required for the taking-out or insertion of a cartridge from or into a cell and electric power. Further, the life of the device can be prolonged. In a case where misalignment exists and is left unattended, the misalignment increases, with the result that, in the next operation time, not only the first access means but also the second access means may fail to complete the taking-out or insertion of a cartridge from or into a cell. The present invention can eliminate such a possibility.

According to the present invention, unnecessary operation can be omitted.

According to the present invention, a possibility that the second access means succeeds in the taking-out or insertion of a cartridge from or into a cell can be increased under an X- and Y-axis position control.

According to the present invention, a possibility that the second access means succeeds in the taking-out or insertion of a cartridge from or into a cell can be increased under the X- and Y-axis position control even in a case where an initial stop position has been misaligned both in X- and Y-directions.

According to the present invention, a possibility that excess compensation causes the second access means to fail to complete the taking-out or insertion of a cartridge from or into a cell at the direction opposite to the misalignment direction of the initial stop position can be eliminated.

According to the present invention, taking-out feasible area or insertion feasible area can be increased at a maximum.

According to the present invention, the second access means can perform the taking-out or insertion of a cartridge from or into a cell at the position in the vicinity of the center of the normal taking-out area or normal insertion area in a case where an initial stop position has slightly deviated from the normal taking-out area or normal insertion area.

According to the present invention, it is possible to prevent hunting and diverging phenomena from occurring at an initial stop position due to update of the initial stop position.

According to the present invention, it becomes more likely that the first access means succeeds in the taking-out or insertion of a cartridge from or into a cell in the next operation.

According to the present invention, an updated initial stop position can be set at the position in the vicinity of the center of the normal taking-out area or normal insertion area in a case where the initial stop position has slightly deviated from the normal taking-out area or normal insertion area.

DETAILED DESCRIPTION OF THE PREFERRED EMBODIMENTS

A preferred embodiment of the present invention will be described below in detail with reference to the accompanying drawings.

Figure 1:
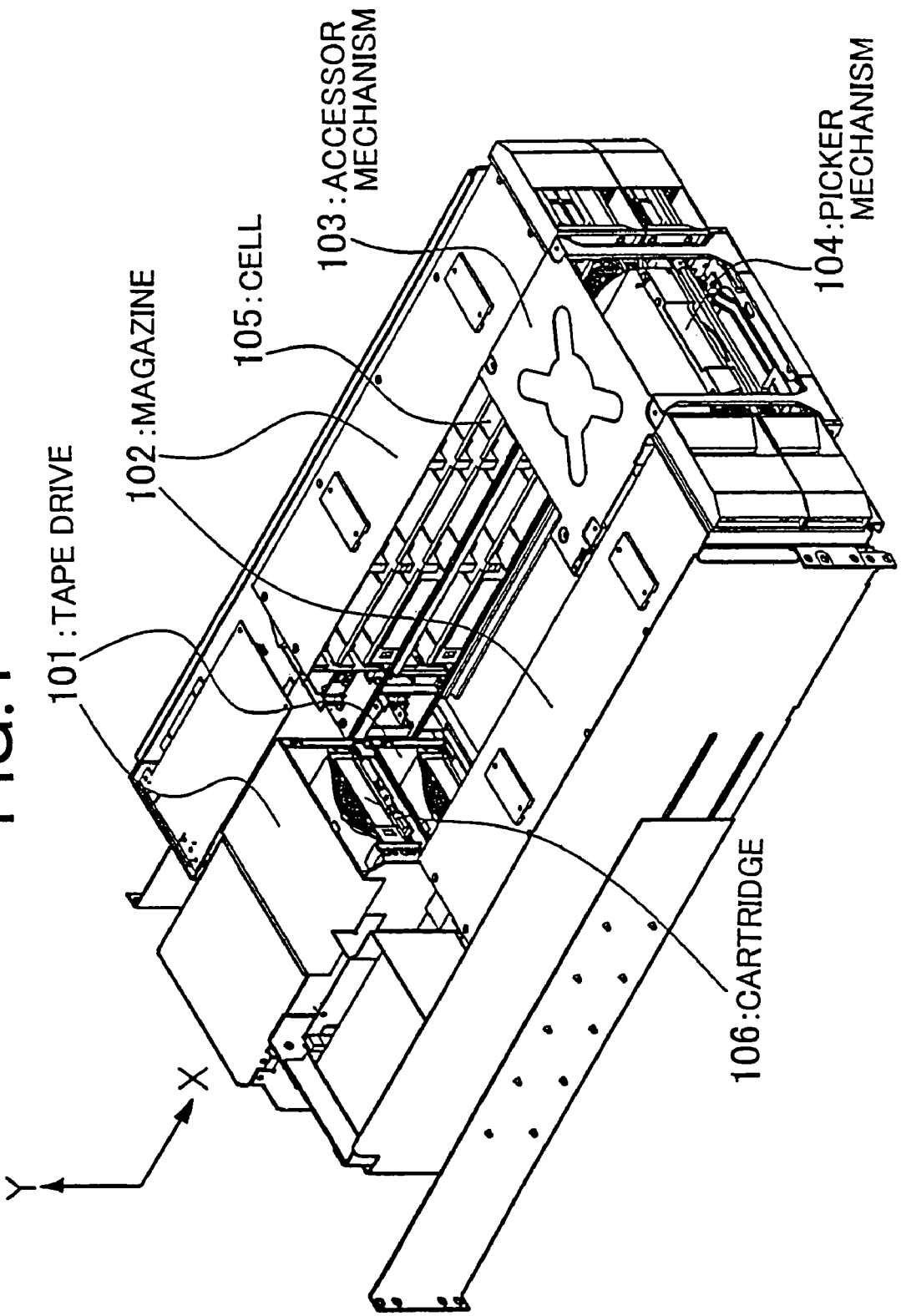
FIG. 1 is a perspective view showing a structure of a collective magnetic tape drive according to an embodiment of the present invention.

FIG. 1 is a perspective view showing a structure of a collective magnetic tape drive according to the embodiment of the present invention. The collective magnetic tape drive includes a tape drive 101, two magazines 102 and an accessor mechanism 103. Each of the magazines 102 includes a plurality of cells 105 arranged two dimensionally in X- and Y-directions. A cartridge 106 is housed in each of the cells 105. The accessor mechanism 103 includes a picker mechanism 104. The main body of the accessor mechanism 103 is movable in X-direction. The picker mechanism 104 is movable in Y-direction and can be rotated about Y-axis.

In order to complete loading of the cartridge 106 that has been inserted into a certain cell into the tape drive 101, the following operation is performed. That is, the position of the accessor mechanism 103 in X-direction is firstly shifted to the stop position corresponding to the position of the target cell in X-direction, the position of the picker mechanism 104 in Y-direction is then shifted to the stop position corresponding to the position of the target cell in Y-direction, the picker mechanism 104 is rotated to face the magazine 102 including the target cell, whereby the picker mechanism 104 faces the front of the target cell. After that, as described later, the cartridge 106 is taken out of the target cell and loaded into the picker mechanism 104. Then, the accessor mechanism 103 is shifted in X-direction, and the picker mechanism 104 is shifted in Y-direction and rotated to face the tape drive 101. The cartridge 106 is then unloaded from the picker mechanism 104 and loaded into the tape drive 101.

When the cartridge 106 that has been loaded into the tape drive 101 is set back to the cell, the operation opposite to the above is performed.

Figure 2:
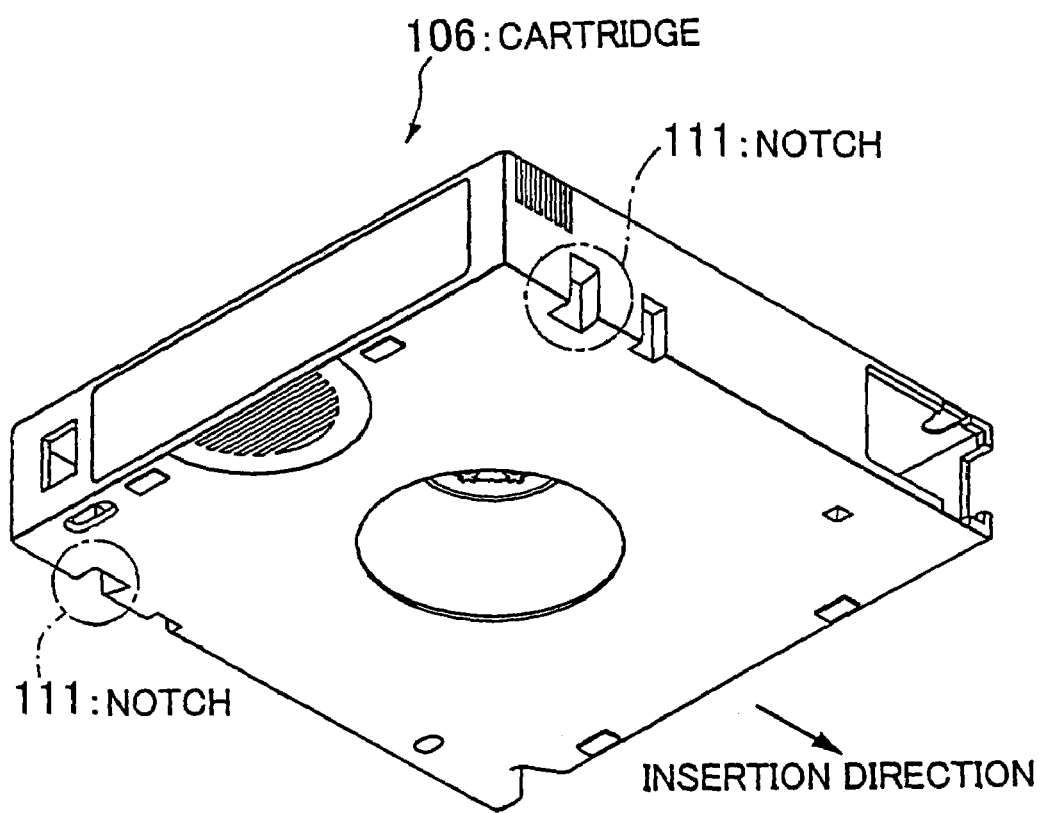
FIG. 2 is a perspective view showing a cartridge according to the embodiment of the present invention.
Figure 3:
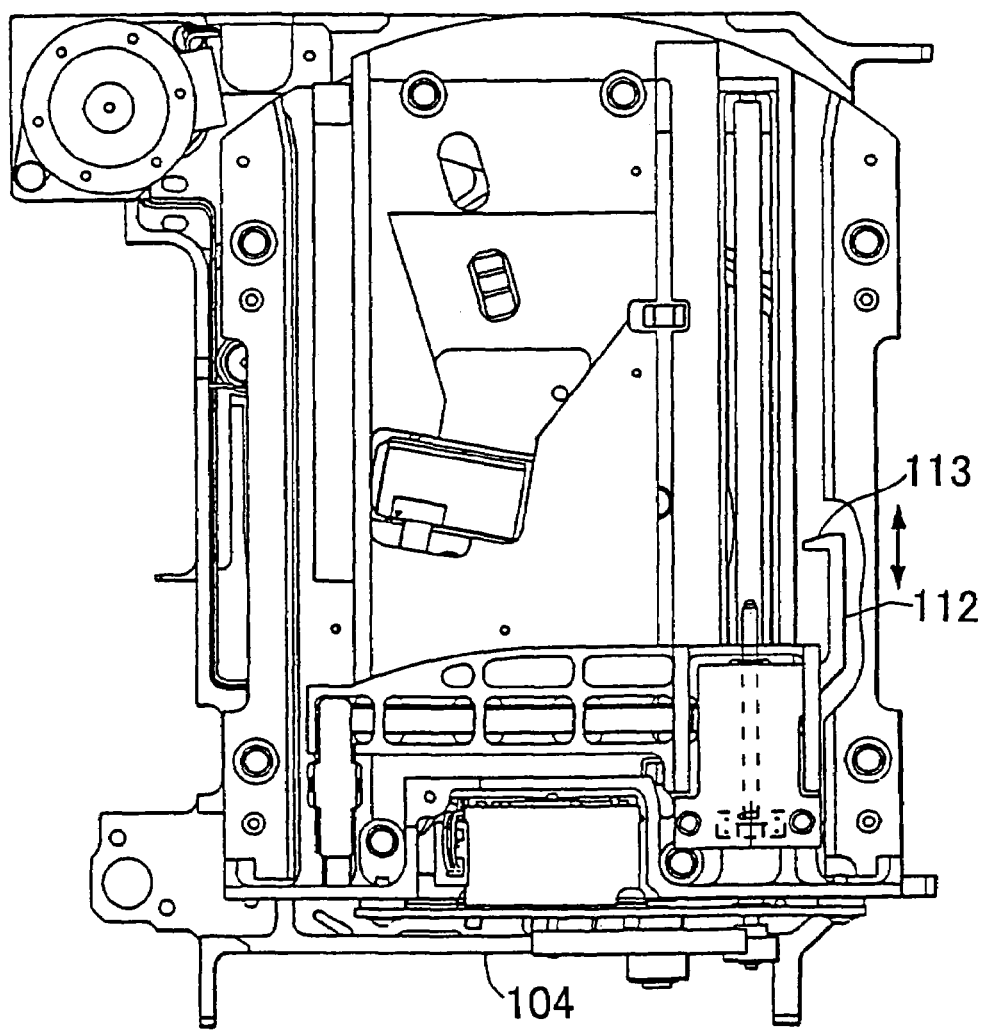
FIG. 3 is a front view showing a structure of a picker mechanism according to the embodiment of the present invention.

Referring to FIG. 2, notches 111 are formed at both side surfaces of the cartridge 106. Referring to FIG. 3, the picker mechanism 104 includes a picker arm 112. The picker arm 112 has an L-shape and is provided with a nail 113. The picker arm 112 is movable in the depth direction of the picker mechanism 104 as denoted by a two-headed arrow in FIG. 3.

An operation for taking out the cartridge 106 that has been inserted into the cell 105 from the cell 105 and loading the cartridge into the picker mechanism 104 will next be described below.

Figure 4:
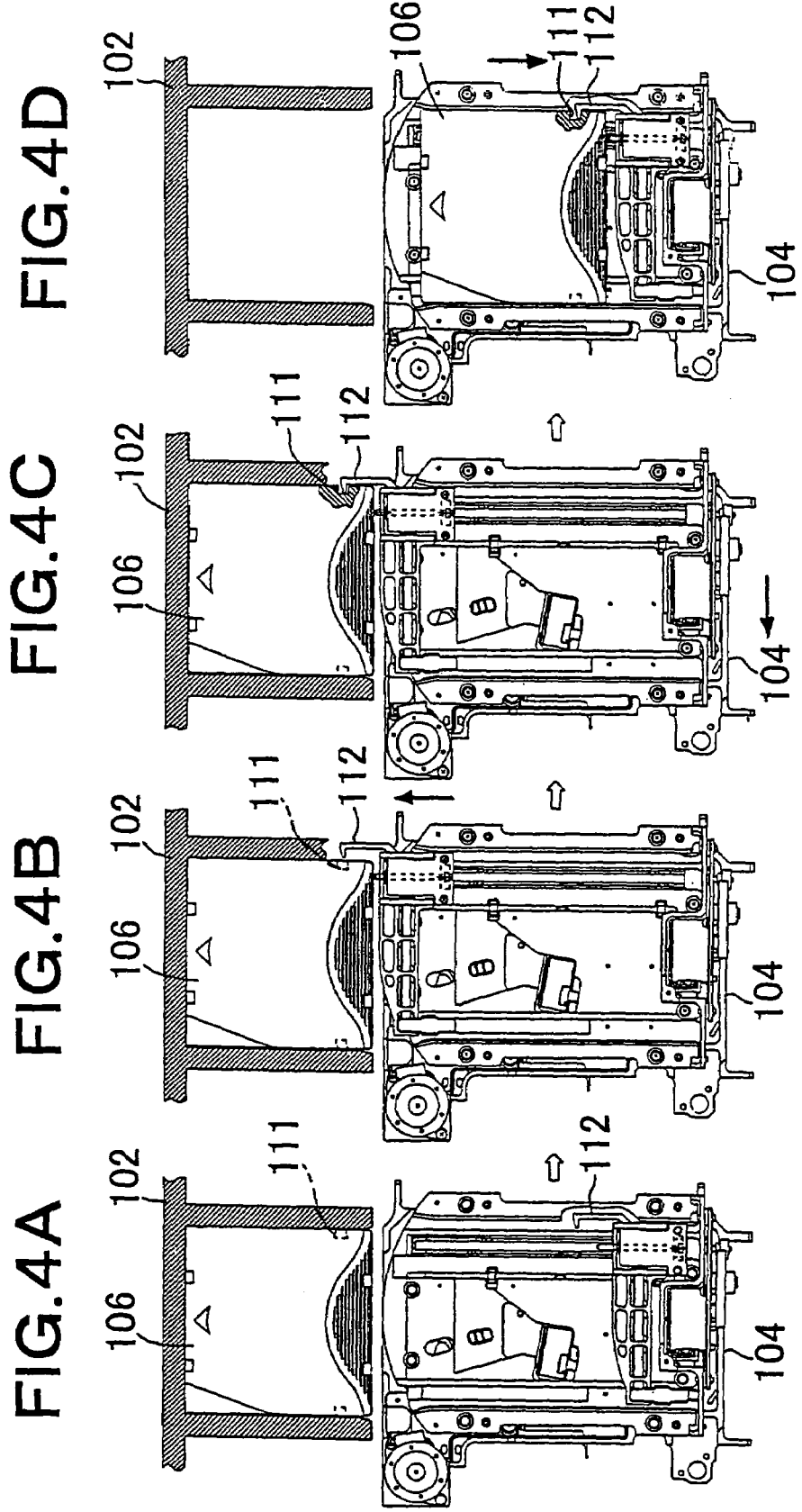
FIGS. 4A to 4D are views for explaining a taking-out operation of the cartridge from a cell according to the embodiment of the present invention.

Firstly, as shown in FIG. 4A, the picker mechanism 104 is shifted to the front of a desirable cell 105. In this state, the picker arm 112 has been housed in the home position within the picker mechanism 104. Then, as shown in FIG. 4B, the picker arm 112 is forwarded in the depth direction of the picker mechanism 104 to the side of the notch 111. The accessor mechanism 103 is then set back in X-direction as shown in FIG. 4C to allow the nail 113 to engage with the notch 111. Next, as shown in FIG. 4D, the picker arm 112 is set back in the depth direction to the home position thereof, whereby the cartridge 106 is taken out of the cell 105 and loaded into the picker mechanism 104.

An operation for unloading the cartridge 106 that has been loaded into the picker mechanism 104 from the picker mechanism 104 and inserting the cartridge 106 into the cell 105 will next be described below.

Figure 5:
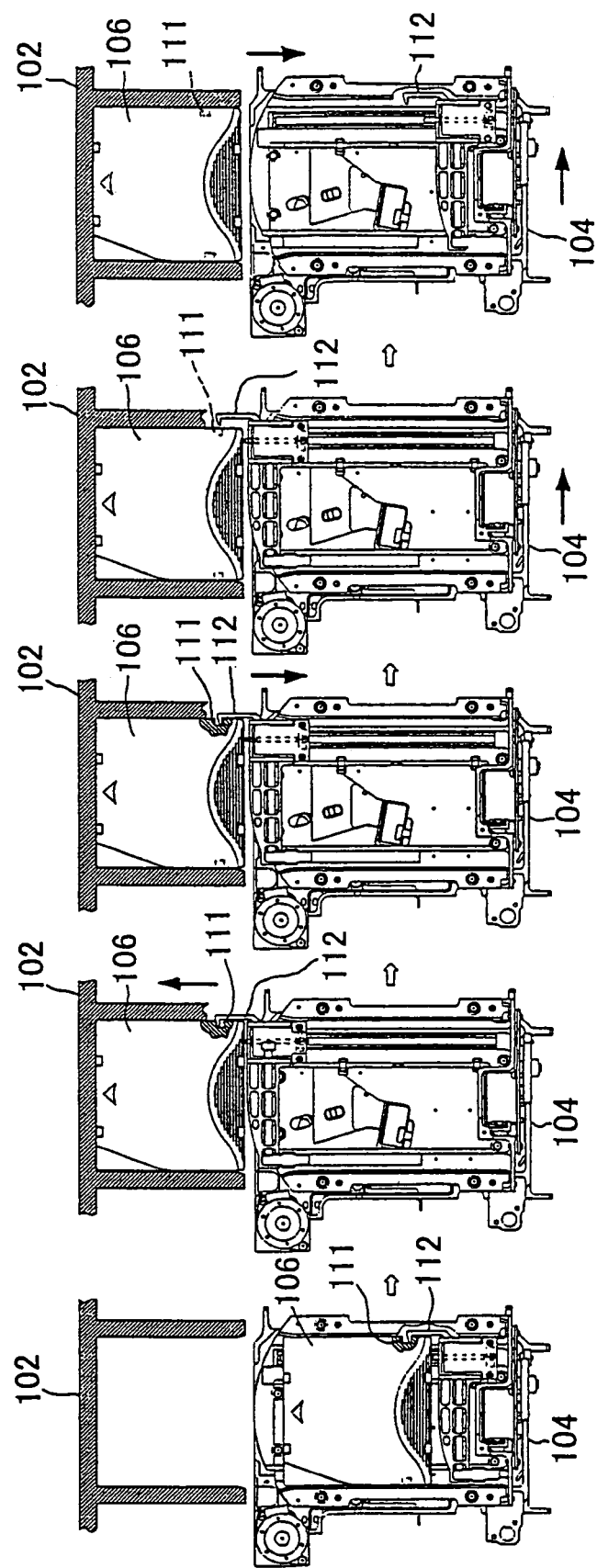
FIGS. 5A to 5E are views for explaining an insertion operation of the cartridge into a cell according to the embodiment of the present invention.

Firstly, as shown in FIG. 5A, the picker mechanism 104 is shifted to the front of a desired cell 105. In this state, the picker arm 112 has been housed in the home position within the picker mechanism 104, the cartridge 106 has been loaded into the picker mechanism 104, and the nail 113 has engaged with the notch 111. Then, as shown in FIG. 5B, the picker arm 112 is forwarded in the depth direction of the picker mechanism 104 until the cartridge 106 has butted against the backboard of the cell 105. Next, as shown in FIG. 5C, the picker arm 112 is slightly set back in the depth direction to eliminate the contact between the nail 113 and notch 111. The accessor mechanism 103 is then forwarded in X-direction as shown in FIG. 5D to release the engagement between the nail 113 and notch 111. Then, the picker arm 112 is set back to the home position thereof, as shown in FIG. 5E.

Figure 9:
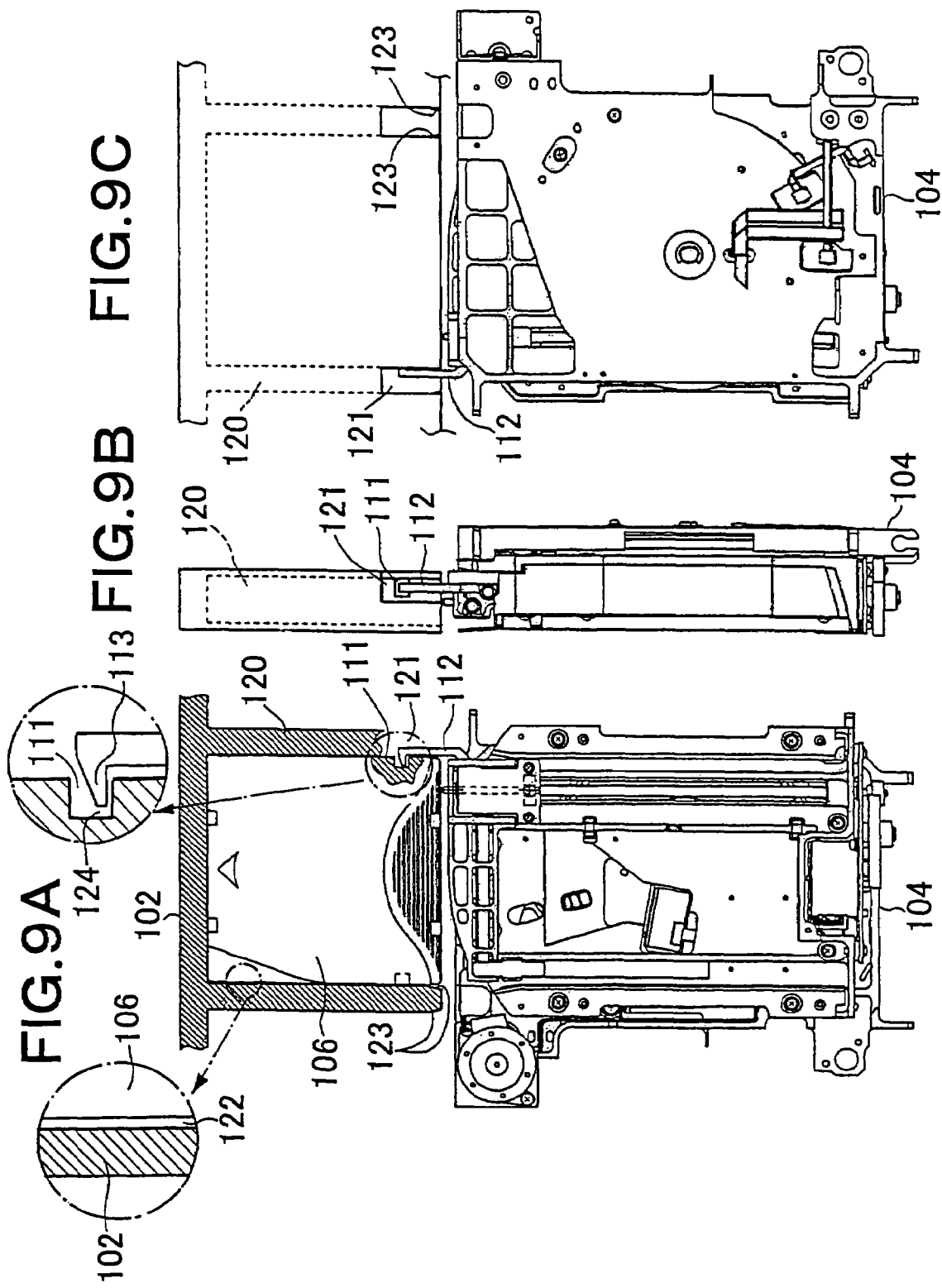
FIGS. 9A to 9C are front view, side view, and back view, respectively, showing a detailed structure of the magazine according to the embodiment of the present invention.

Referring to FIGS. 9A, 9B and 9C, a vertical partition board 120 for partitioning the cells 105 adjacently arranged to each other in X-direction within the magazine 102 has a cavity portion 121 to avoid interference with the picker arm 112 to be forwarded in the depth direction. This can be seen from the perspective view of FIG. 1. Accordingly, in the cavity portion 121, the cells 105 that are adjacently arranged to each other in the horizontal direction directly face each other without the vertical partition board 120 being interposed between the cells. The picker arm 112 enters the cavity portion 121. Further, a taper portion 123 is formed at the entrance of the vertical partition board 120. Likewise, a horizontal partition board (not shown) for partitioning the cells 105 adjacently arranged to each other in Y-direction has a taper portion. Accordingly, the taper portions are formed in four sides of the cell 105 at the entrance of the cell. By forming the taper portions as described above, even when the stop position of the picker mechanism 104 is misaligned with the front of the target cell 105, it is possible to absorb the misalignment to complete insertion of the cartridge 106 into the target cell 105. Further, a shroud that surrounds the cartridge 106 that has been loaded into the picker mechanism 104 has taper portions, by which even when the stop position of the picker mechanism 104 is misaligned with the front of the target cell 105, it is possible to absorb the misalignment to complete loading of the cartridge 106 into the picker mechanism.

A plate spring is formed on the right surface of the vertical partition board 120, which pushes the cartridge 106 that has been inserted into the cell 105 in the right direction (direction in which X-coordinate increases). Therefore, as shown in FIG. 9A, a cavity portion 122 is formed between the vertical partition board 120 and cartridge 106.

Next, a description will be given of a case where an access fails. The term "access" mentioned here denotes the taking-out of the cartridge 106 from the cell 105, which has been described with reference to FIGS. 4A-4D, or the insertion of the cartridge 106 into the cell 105, which has been described with reference to FIGS. 5A-5E. The coordinate of the cell 105 to be accessed has been determined in the device design, and the accessor mechanism 103 and picker mechanism 104 are shifted to the stop position corresponding to the coordinate by the position servo control. However, the picker mechanism 104 is not always stopped at the front of the cell 105 due to attachment errors, dimension errors, or distortion of the magazine 102 and the like. When the misalignment of the stop position of the picker mechanism 104 has exceeded the allowable value, the access will fail.

Firstly, the allowance value of the misalignment of the stop position at the taking-out time will be described. The allowance value will not exceed the taper amount of each of the taper portions of the shroud in the picker mechanism 104 with respect to plus X-direction, minus X-direction, plus Y-direction, and minus Y-direction. Therefore, the problem lies in whether the factor other than the taper amount further reduces the allowable value. Note that when the misalignment has exceeded the taper amount, the cartridge 106 butts against the shroud in the process when the picker arm 112 is set back in the depth direction, so that the taking-out of the cartridge fails.

When the leading edge of the picker arm 112 butts against the front surface of the cartridge 106 in the process when the picker arm 112 is forwarded in the depth direction, the taking-out of the cartridge fails. This occurs in a case where the misalignment is larger than the taper amount in the design dimension, and does not become a restriction on the allowable value. Note that at the time point when the leading edge of the picker arm 112 butts against the front surface of the cartridge 106, an error occurs to cause the taking-out operation to fail.

When the accessor mechanism 103 is set back in X-direction to allow the nail 113 to engage with the notch 111, the cavity portion 122 is maintained, and a cavity portion 124 (see FIG. 9) between the bottom surface of the notch 111 and leading edge of the nail 113 is also maintained in normal cases. However, when the stop point of the accessor mechanism 103 is excessively misaligned in minus X-direction, the both cavity portions 122 and 124 are eliminated. In this case, an error occurs while the accessor mechanism 103 is set back in X-direction to cause the taking-out operation to fail. This can be a restriction on the allowable value because the sum of the dimensions of the cavity portions 122 and 124 are smaller than the taper amount.

When the stop position of the accessor mechanism 103 is excessively misaligned in plus X-direction, the nail 113 cannot engage with the notch 111 even if the accessor mechanism 103 is set back in X-direction. However, in the design dimension, the misalignment in a case where the engagement cannot be made is larger than the taper amount. Therefore, this does not become a restriction on the allowable value. Note that, in the case described above, the cartridge 106 is not loaded into the picker mechanism 104 even after the completion of a series of the taking-out operations, so that the cartridge 106 cannot be taken out.

When the stop position of the picker mechanism 104 is excessively misaligned in minus Y-direction, the leading edge of the picker arm 112 butts against the horizontal partition board in the process when the picker arm 112 is forwarded in the depth direction to cause the taking-out operation to fail. However, in the design dimension, the misalignment in a case where the butting occurs is larger than the taper amount. Therefore, this does not become a restriction on the allowable value.

When the stop position of the picker mechanism 104 is excessively misaligned in plus Y-direction, the leading edge of the nail 113 does not engage with the notch 111 but butts against the side surface of the cartridge 106 in the process when the accessor mechanism 103 is set back in X-direction to cause the taking-out operation to fail. However, in the design dimension, the misalignment in the case described above is larger than the taper amount. Therefore, this does not become a restriction on the allowable value.

Figure 10:
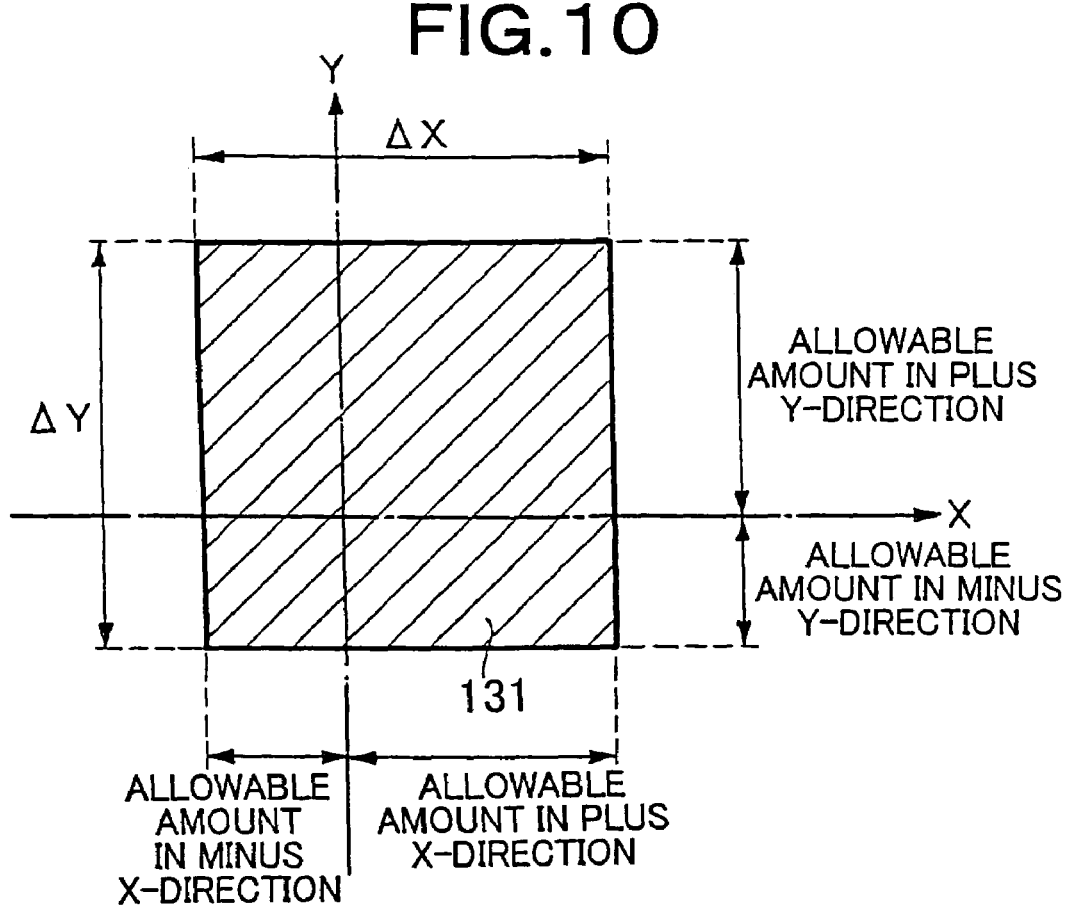
FIG. 10 is a view showing a normal taking-out area according to the embodiment of the present invention.

As described above, the allowable value in the taking-out time is determined as shown in FIG. 10 with respect to plus X-direction, minus X-direction, plus Y-direction, and minus Y-direction, although all restriction factors are not explained. In order for the taking-out operation to be normally completed, the stop position of the picker mechanism 104 must fall within the square (normal taking-out area) 131 denoted by oblique lines in FIG. 10.

Also as to the insertion operation, the area (normal insertion area) same as the normal taking-out area 131 shown in FIG. 10, where the insertion operation is normally completed is determined depending on the taper amount and other restriction factors. Note that the normal insertion area 131 is not always the same as the normal taking-out area.

When the stop position of the picker mechanism 104 does not fall within the normal taking-out area, an error occurs in any of the processes in the taking-out operation to cause the taking-out operation to fail. Likewise, when the stop position of the picker mechanism 104 does not fall within the normal insertion area, an error occurs in any of the processes in the insertion operation to cause the insertion operation to fail.

Figure 11:
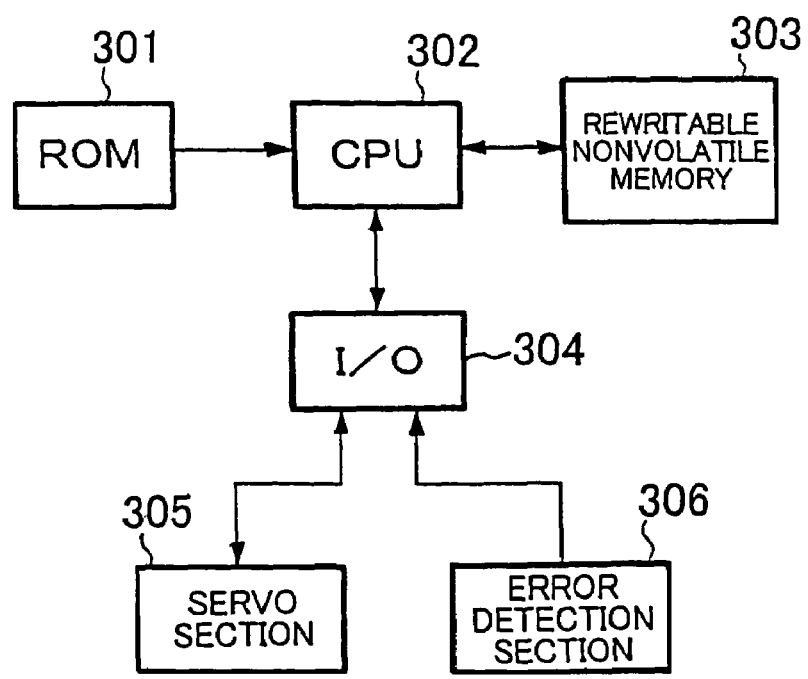
FIG. 11 is a block diagram showing a device that performs the operation for accessing a cell and the operation associated to the cell-access operation according to the embodiment of the present invention.

In the present embodiment, an operation for accessing a cell and an operation associated with the cell-access operation as described below are performed using a ROM 301, a CPU 302, a rewritable nonvolatile memory 303, an input/output interface (I/O) 304, a servo section 305 and an error detection section 306 shown in FIG. 11. This access operation includes a stop position compensation function. The term "stop position" mentioned here is the stop position of the accessor mechanism 103 in X-direction and the stop position of the picker mechanism 104 in Y-direction, which determines the stop positions of the picker mechanism 104 and picker arm 112 relative to a target cell, and determines the stop position of the cartridge 106 relative to a target cell in the case of the insertion operation of the cartridge 106 into the cell 105, which has been described with reference to FIG. 5. Although the rotation of the picker mechanism 104 is not mentioned in the following description, the picker mechanism 104 actually is rotated to face the magazine 102 including a target cell in the access time and is rotated to face the tape drive 101 at the loading time. The CPU 302 reads in and executes a program stored in the ROM 301 to perform each part in the following operations. The rewritable nonvolatile memory 303 stores the stop positions in X- and Y-directions corresponding to each cell. The servo section 305 shifts the accessor mechanism 103 to the stop position thereof in X-direction and an area in the vicinity of the stop position and shifts the picker mechanism 104 to the stop position thereof in Y-direction and an area in the vicinity of the stop position. The error detection section 306 detects that the access has not been normally completed. The I/O 304 interfaces between the CPU 302 and servo section 305 and between the CPU 302 and error detection section 306.

Figure 6:
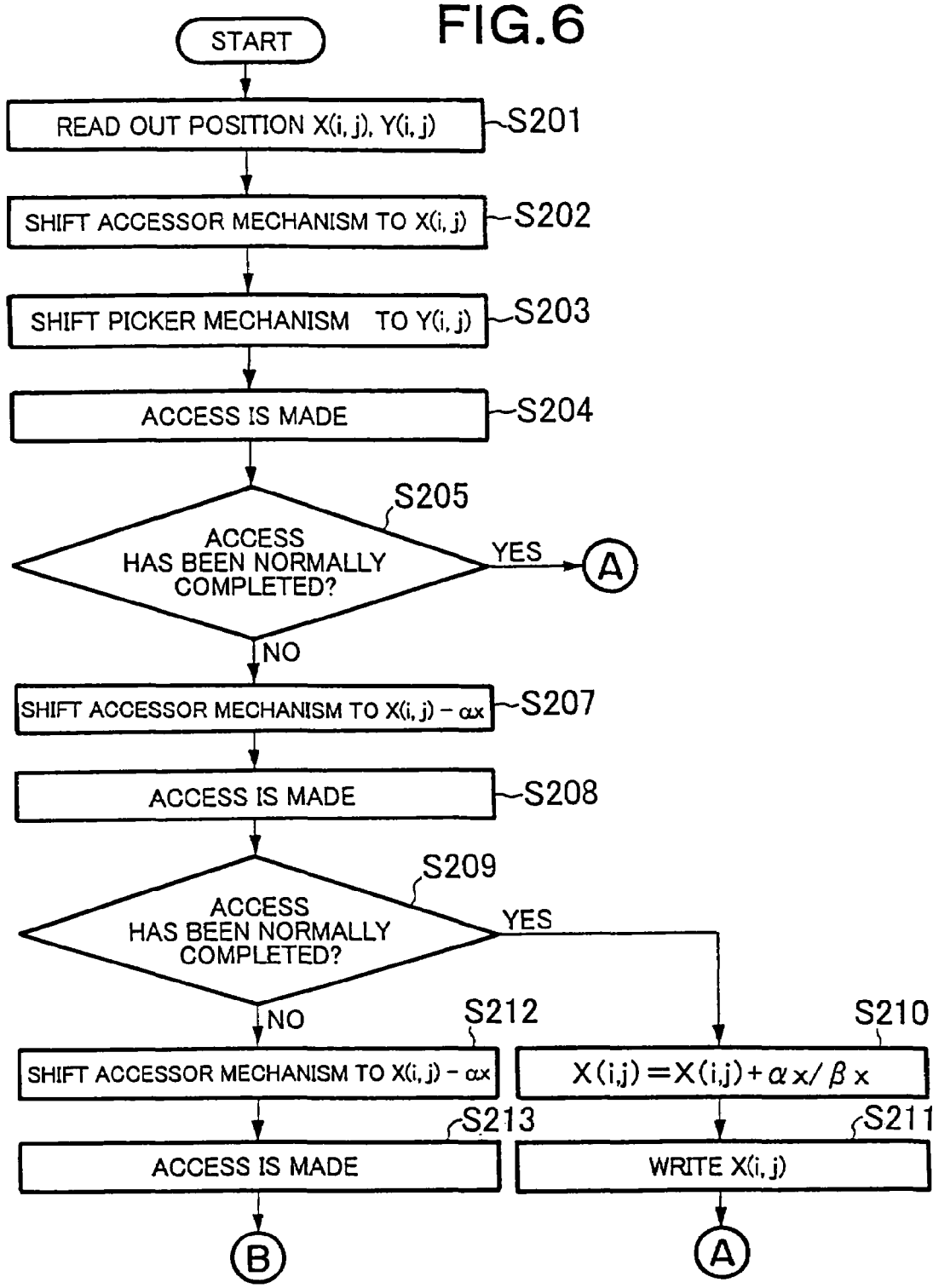
FIG. 6 is a first flowchart for explaining an operation for accessing a cell and an operation associated with the cell-access operation according to the embodiment of the present invention.
Figure 8:
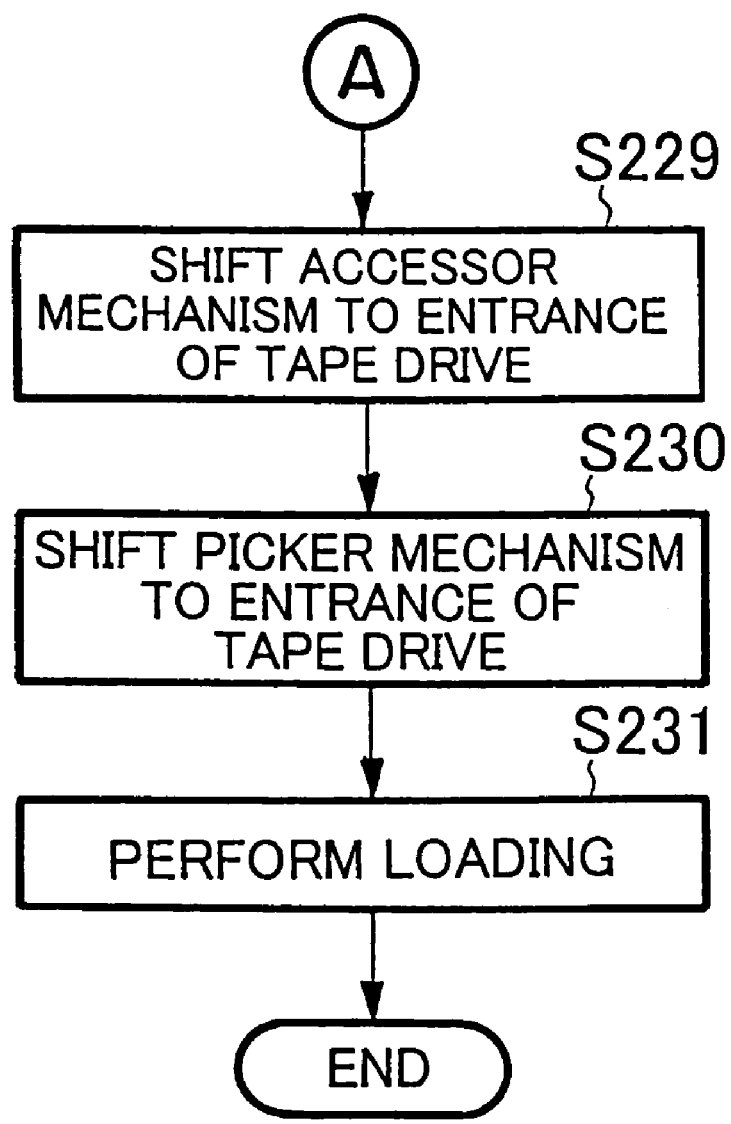
FIG. 8 is a third flowchart for explaining the operation for accessing a cell and the operation associated with the cell-access operation according to the embodiment of the present invention.

Referring to FIG. 6, the stop positions in X-direction X(i, j) and Y-direction Y(i, j) corresponding to a target cell (cell(i, j), where i is an integer from 1 to m, and j is an integer from 1 to n) are firstly read out from the rewritable nonvolatile memory 303. The read out stop positions in X-direction X(i, j) and Y-direction Y(i, j) are set as an initial stop position (step S201). The accessor mechanism 103 is then shifted to the stop position in X-direction X(i, j) (step S202), and the picker mechanism 104 is shifted to the stop position in Y-direction Y(i, j) (step S203). With the above operation, the picker mechanism 104 reaches the initial stop position. Next, the access operation is carried out (step S204). After that, it is determined whether the access operation of step S204 has been normally completed (step S205). When it has been determined that the access operation of step S204 has been normally completed (Yes in step S205), the flow advances to step S229 (FIG. 8).

When it has been determined that the access operation of step S204 has not been normally completed (No in step S205), the accessor mechanism 103 is shifted to X(i, j)+αx (step S207). The stop position of the picker mechanism 104 in Y-direction is maintained at Y(i, j). Next, the access operation is carried out (step S208). After that, it is determined whether the access operation of step S208 has been normally completed (step S209). When it has been determined that the access operation of step S208 has been normally completed (Yes in step S209), αx/βx is added to X(i, j)(step S210), the obtained X(i, j) is written into the rewritable nonvolatile memory 303 (step S211), and the flow advances to step 229 (FIG. 8).

Figure 7:
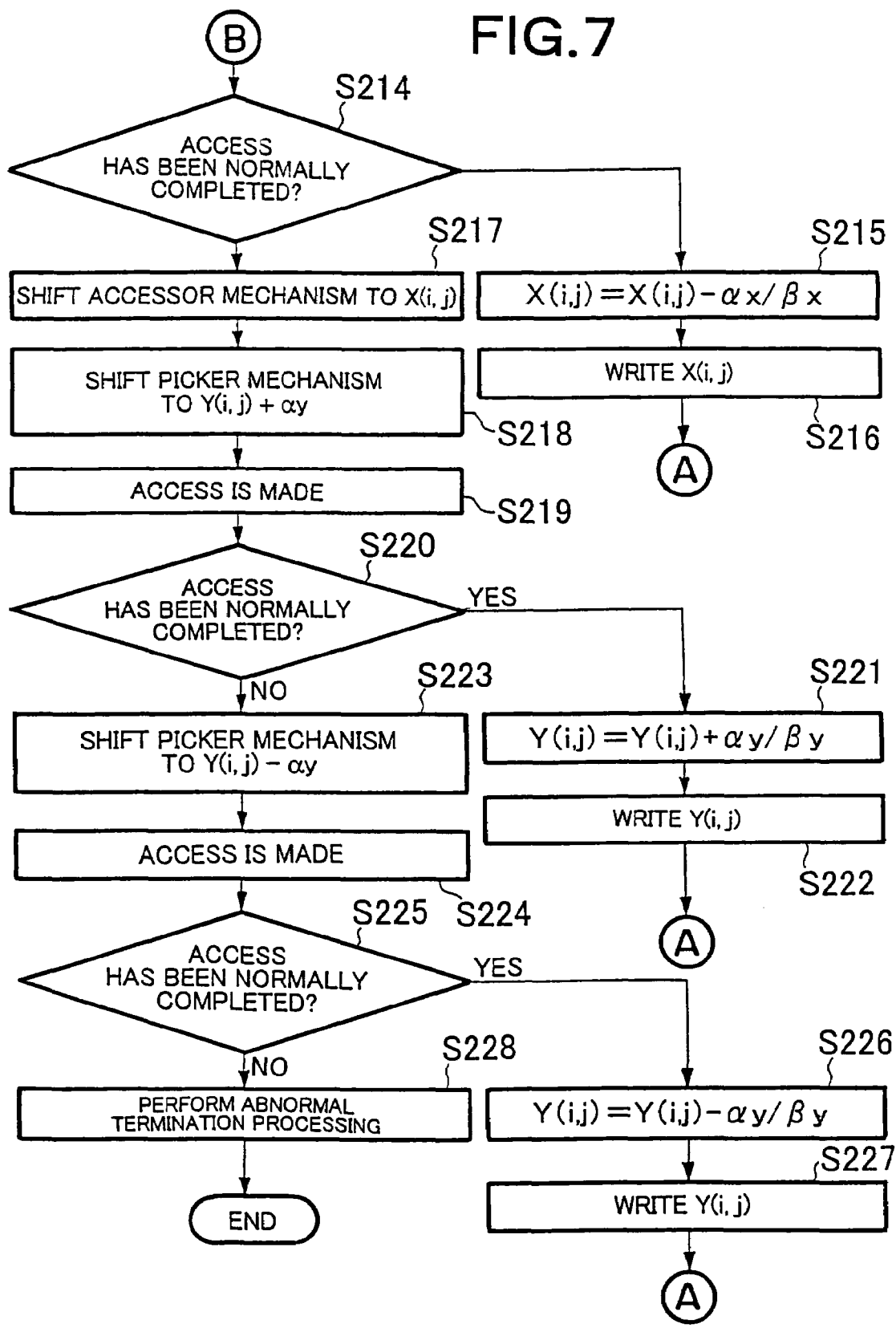
FIG. 7 is a second flowchart for explaining the operation for accessing a cell and the operation associated with the cell-access operation according to the embodiment of the present invention.

When it has been determined that the access operation of step S208 has not been normally completed (No in step S209), the accessor mechanism 103 is shifted to X(i, j)−αx (step S212). The stop position of the picker mechanism 104 in Y-direction is maintained at Y(i, j). Next, the access operation is carried out (step S213). Then, it is determined whether the access operation of step S213 has been normally completed (step S214), as shown in FIG. 7. When it has been determined that the access operation of step S213 has been normally completed (Yes in step S214), αx/βx is subtracted from X(i, j) (step S215), the obtained X(i, j) is written into the rewritable nonvolatile memory 303 (step S216), and the flow advances to step S229 (FIG. 8).

When it has been determined that the access operation of step S213 has not been normally completed (No in step S214), the accessor mechanism 103 is shifted to X(i, j)(step S217), and the picker mechanism 104 is shifted to Y(i, j)+αY (step S218). Next, the access operation is carried out (step S219). After that, it is determined whether the access operation of step S219 has been normally completed (step S220). When it has been determined that the access operation of step S219 has been normally completed (Yes in step S220), αY/βY is added to Y(i, j)(step S221), the obtained Y(i, j) is written into the rewritable nonvolatile memory 303 (step S222), and the flow advances to step S229 (FIG. 8).

When it has been determined that the access operation of step S219 has not been normally completed (No in step S220), the picker mechanism 104 is shifted to Y(i, j)−αY (step S223). The stop position of the accessor mechanism 103 in X-direction is maintained at X(i, j). Next, the access operation is carried out (step S224). After that, it is determined whether the access operation of step S224 has been normally completed (step S225). When it has been determined that the access operation of step S224 has been normally completed (Yes in step S225), αY/βY is subtracted from Y(i, j)(step S226), the obtained Y(i, j) is written into the rewritable nonvolatile memory 303 (step S227), and the flow advances to step S229 (FIG. 8).

When it has been determined that the access operation of step S224 has not been normally completed (No in step S225), the operation is ended after abnormal termination processing (step S228).

Referring to FIG. 8, in step S229, the accessor mechanism 103 is shifted to the position corresponding to the entrance of the tape drive 101 in X-direction. Next, the picker mechanism 104 is shifted to the position corresponding to the entrance of the tape drive 101 in Y-direction (step S230). The loading operation is then carried out (step S231) and the operation is ended.

Figure 12:
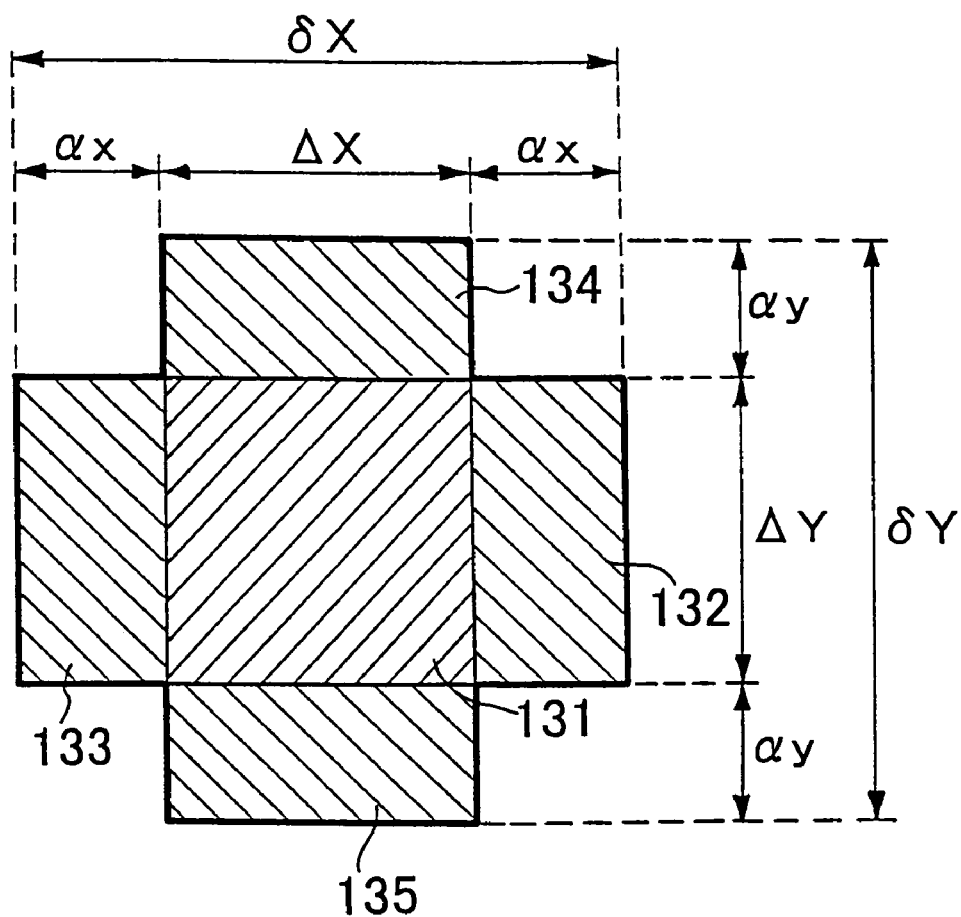
FIG. 12 is a view showing a normal taking-out area and a taking-out feasible area according to the embodiment of the present invention.

The above value of αX at the taking-out time is set to a value more than 0 and not more than the X-direction length ΔX (FIG. 10) of the normal taking-out area 131. This can prevent the stop position in X-direction in step S207 from getting too long to get to the normal taking-out area 131 in a case where the stop position in X-direction in step S202 has been too short to get to the normal taking-out area 131 and can prevent the stop position in X-direction in step S212 from getting too short to get to the normal taking-out area 131 in a case where the stop position in X-direction in step S202 has been too long to get to the normal taking-out area 131. As shown in FIG. 12, as long as the value of αX falls within the above range, the area obtained by adding areas 132 and 133 to the normal taking-out area 131 can be set as the taking-out feasible area. The X-direction length δX of the taking-out feasible area can be obtained by adding (2×αx) to ΔX (δX=ΔX+2×αx).

Setting the value of αx at the length of ΔX can make the X-direction length δX of the taking-out feasible area extend up to the maximum value of 3×ΔX.

On the other hand, when the value of αx is set to the length of ΔX/2, the X-direction length δX of the taking-out feasible area is reduced to 2×ΔX. However, in a case where misalignment gradually increases to cause the stop position in X-direction in step S202 to slightly deviate from the normal taking-out area 131, the stop position in X-direction in step S207 or S212 can be set to the vicinity of the center of the normal taking-out position 131.

The above value of βx is set as follows.

Firstly, in order to avoid occurrence of hunting and diverging phenomena at the stop position in X-direction X(i, j) due to update of the stop position in X-direction X(i, j), the values of αx and βx must be set such that αx/βx becomes not more than ΔX.

Further, it is assumed, for example, that the value of αx is set to the value of ΔX. In this case, when the value of βx is set to 2, αx/βx becomes ΔX/2, with the result that the stop position in X-direction X(i, j) after compensation is set to the vicinity of the center of the normal taking-out area 131 in a case where the stop position in X-direction in step S202 has slightly deviated from the normal taking-out area 131 and the compensation takes place. Further, it is assumed, for example, that the value of αx is set to the value of ΔX/2. In this case, when the value of βx is set to 1, αx/βx becomes ΔX/2, with the result that the stop position in X-direction X(i, j) after compensation is set to the vicinity of the center of the normal taking-out area 131 in a case where the stop position in X-direction in step S202 has slightly deviated from the normal taking-out area 131 and the compensation takes place. If we suppose that most of the causes of the failure of the accessing operation in step S204 lie in that the stop position in X-direction in step S202 slightly deviates from the normal taking-out area 131, and, in this case, in order to set the compensated stop position in X-direction X(i, j) to the vicinity of the center of the normal taking-out area 131, then the values of αx and βx should be set such that αx/βx becomes ΔX/2.

Further, there is a case where the stop position in X-direction in step S202 has largely deviated from the normal taking-out area 131. In this case, in order to increase the possibility that the initial access operation (step S204) succeeds in the next operation starting from step S201 after compensation, it is preferable that the value of αx/βx be close to and not more than ΔX.

The setting of the values of the above αx and βx at the insertion time can be explained by replacing the term "taking-out" with "insertion" in the above seven paragraphs.

The setting of the values of the αY and βY at the taking-out and insertion time can be explained by replacing the term "X" with "Y", "step S202" with "step S203", "step S207" with "step S218", "step S212" with "step S223", and "areas 132 and 133" with "areas 134 and 135" in the above eight paragraphs.

In the above description, the rewritable nonvolatile memory 303 stores the stop positions in X-direction X(i, j) and in Y-direction Y(i, j). Alternatively, however, the following method can be adopted. The method includes: storing a compensation amount of the stop position in X-direction and compensation amount of the stop position in Y-direction for each cell in the rewritable nonvolatile memory 303; calculating a stop position in X-direction and stop position in Y-direction before compensation based on X-origin and Y-origin of the magazine 102, the order of a target cell in X-direction and that in Y-direction, and cell width and height; obtaining a stop position in X-direction X(i, j) by adding the compensation amount of the stop position in X-direction to the stop position in X-direction before compensation; and obtaining a stop position in Y-direction Y(i, j) by adding the compensation amount of the stop position in Y-direction to the stop position in Y-direction before compensation. In this case, the compensation amount of the stop position in X-direction is updated in step S210 or S215, and the compensation amount of the stop position in Y-direction is updated in step S221 or S226.

Figure 13A:
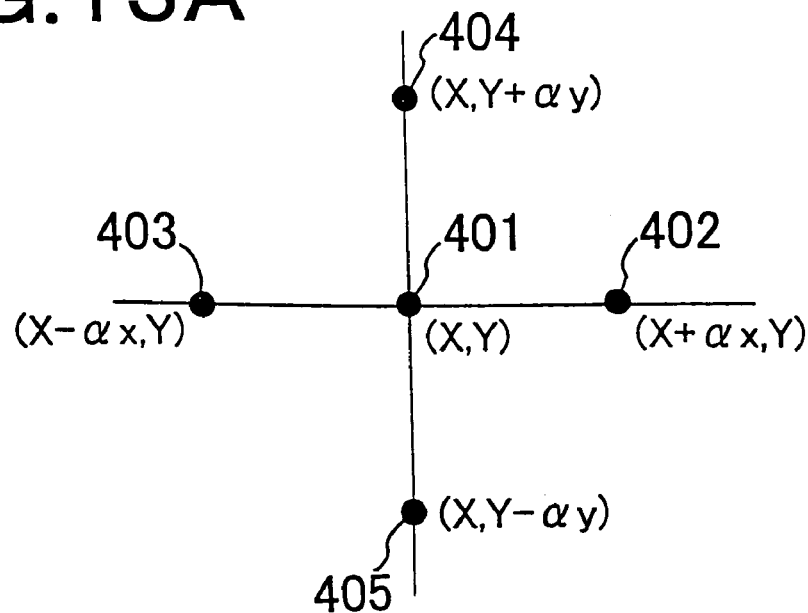
FIGS. 13A and 13B are views showing points to be accessed according to the embodiment of the present invention.
Figure 13B:
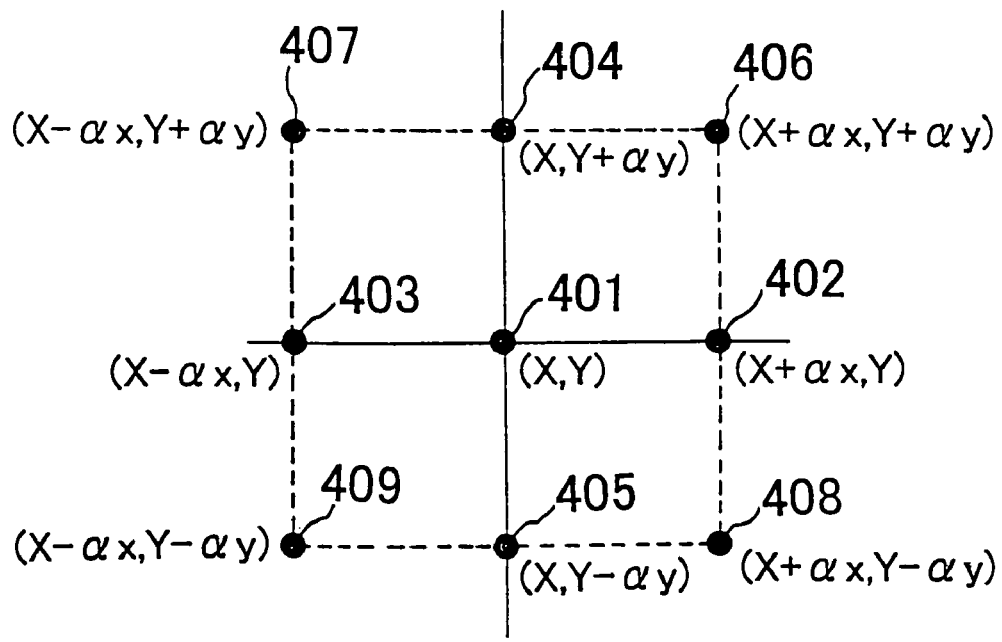

Further, in the above description, the accesses are attempted in five points 401 to 405 arranged crosswise with the initial stop position (stop position in X-direction X(i, j), stop position in Y-direction Y(i, j)) as a center, as shown in FIG. 13A. Alternatively, however, the accesses may be made in nine points 401 to 409 arranged in a lattice manner with the initial stop position (stop position in X-direction X(i, j), stop position in Y-direction Y(i, j)) as a center, as shown in FIG. 13B. By this, it becomes more likely that the access succeeds in any of the additional four points 406 to 409 even in a case where the initial stop position (stop position in X-direction X(i, j), stop position in Y-direction Y(i, j)) has deviated from the normal taking-out area or normal insertion area both in X- and Y-directions.

Further, in the above description, the accesses are made in the five points shown in FIG. 13A in the order of 401, 402, 403, 404, and 405. However, as long as the first access is made in the point 401, the succeeding accesses can be made in any order.

In a case where the accesses are made in the nine points 401 to 409 shown in FIG. 13B, as long as the first access is made in the point 401, the succeeding accesses can be made in any order.

Further, in the above description, the tape cartridge is taken as an example of a cartridge. Besides, the present invention is applicable to, for example, a magnetic optical disk cartridge, a DVD cartridge, and the like.

What is claimed is:

1. A system for accessing a cell, comprising
   an accessor means for removing and inserting a tape cartridge from a target cell;
   a picker mechanism associated with the accessor means for taking possession of and releasing a tape cartridge;
   a plurality of cells for storing tape cartridges, the cells being arrayed in a matrix;
   a memory for storing stop positions of the accessor means and the picker mechanism corresponding to each cell including an initial stop position of the accessor means and the picker mechanism, wherein the stop position of the accessor means is designated by an X coordinate and the stop position of the picker mechanism is designated by an Y coordinate;
   a drive mechanism for driving the accessor means and the picker mechanism to the stop positions corresponding to each cell according to the X coordinate and the Y coordinate stored in the memory, and for drawing the picker mechanism through the removal of a tape cartridge from a cell and the insertion of a tape cartridge from a cell;
   a detection means for detecting whether the accessor means has successfully removed or inserted the tape cartridge to or from the cell based on the alignment between the accessor means or the picker mechanism and the corresponding cell; and
   a microcontroller means for compensating the misalignment between the accessor means or the picker mechanism and the corresponding cell when the tape cartridge is not successfully removed or inserted relative to the cell, by updating the stop positions by way of incrementally adjusting at lease one of the X coordinate and the Y coordinate, instructing the drive mechanism to drive the accessor means and the picker mechanism at the updated stop positions to retry the removal and insertion of the tape cartridge relative to the cell,
   wherein the microcontroller means rewrites the X coordinate and the Y coordinate of the updated stop positions into the memory upon the successful completion of the removal or insertion of the tape cartridge relative to the cell.

2. The system according to claim 1, further comprising access operation terminating means for terminating the removing or inserting of a tape cartridge from a target cell where the accessor means has failed to remove or insert the tape after a predetermined number of removal or insertion retries.

3. The system according to claim 1, wherein the updated stop positions include at least four positions differentiated from the initial stop position in the left, right, up and down directions, relative to the initial stop position.

4. The system according to claim 1, wherein the updated stop positions includes eight positions differentiated from the initial stop position arranged in a lattice manner at which four cross-shapes intersect with each other, the centers of the four cross-shapes extending from each of four positions apart from the initial stop position in the left, right, up and down directions.

5. The system according to claim 1, wherein the incremented adjustment of at least one of the X coordinates of the accessor means corresponds to one of the updated stop positions differentiated from the initial stop position in a predetermined direction by a distance not more than the length of a normal removal area or normal insertion area.

6. The system according to claim 5, wherein the incremented adjustment of the X coordinate of the accessor means corresponds to one of the updated stop positions differentiated from the initial stop position in a predetermined direction by a distance equal to the length of a normal removal area or normal insertion area.

7. The system according to claim 5, wherein the incremented adjustment of the X coordinate of the accessor means corresponds to one of the updated positions differentiated from the initial stop position in a predetermined direction by a distance equal to the half of the length of a normal removal area or normal insertion area.

8. The system according to claim 1, wherein a difference between the initial stop position and one of the updated stop positions in a predetermined direction is set to not more than the length of a normal removal area or normal insertion area in the predetermined direction.

9. The system according to claim 8, wherein the difference between the initial stop position and one of the updated stop positions in a predetermined direction is set equal to the length of a normal removal area or normal insertion area in the predetermined direction.

10. The system according to claim 8, wherein the difference between the initial stop position and one of the updated stop positions in a predetermined direction is set to half of the length of a normal removal area or normal insertion area in the predetermined direction.

11. A method for accessing a cell adapted for retaining a tape cartridge comprising:

(a) at least one first access step comprised of an attempt to complete one of a taking out a cartridge from a cell or inserting the cartridge into the cell, the first access step occurring at an initial stop position designated by an X coordinate and a Y coordinate;

(b) at least one determination step, to determine whether the first access step has succeeded or failed;

(c) if it is determined that the first access step has failed, a step of obtaining updated stop positions relative to the initial stop position by incrementally adjusting at least one of the X coordinate and the Y coordinate;

(d) if it is determined that the first access step has failed, at least one subsequent access step of taking out the cartridge from the cell or inserting the cartridge into the cell, at one of the updated stop positions;

(e) if the at least one subsequent access step was necessary, at least one subsequent determination step to determine whether the subsequent access step has succeeded or failed; and (f) if it is determined that the subsequent access step has failed, a step of repeating (c)-(e).

12. The method according to claim 11, further comprising:
a step of terminating the subsequent access step in a case where the subsequent access step has failed to complete the taking-out or insertion operation in a predetermined number of the updated stop positions.

13. The method according to claim 11, wherein the updated stop positions include four positions apart from the initial stop position in the left, right, up and down directions.

14. The method according to claim 11, wherein the updated stop positions include eight positions obtained by excluding the initial stop position from nine positions arranged in a lattice manner at which four cross-shapes intersect with each other, the centers of the four cross-shapes extending from each of four positions apart from the initial stop position in the left, right, up and down directions.

15. The method according to claim 11, wherein at least one of the updated stop positions is set at the position apart from the initial stop position in a particular direction by a distance not more than the length of a normal taking-out area or normal insertion area.

16. The method according to claim 15, wherein at least one of the updated stop positions is set at the position apart from the initial stop position in a particular direction by a distance equal to the length of a normal taking-out area or normal insertion area.

17. The method according to claim 15, wherein at least one of the updated stop positions is set at the position apart from the initial stop position in a particular direction by a distance equal to the half of the length of a normal taking-out area or normal insertion area.

18. The method according to claim 11, further comprising:
an step of rewriting the X coordinate and Y coordinate of the updated stop position to a memory if it is determined that the subsequent access step succeeded.

19. The method according to claim 18, wherein a difference between the initial stop position and one of the updated stop positions in a particular direction is set to not more than the length of a normal taking-out area or normal insertion area in the particular direction.

20. The method according to claim 19, wherein a difference between the initial stop position and one of the updated stop positions in a particular direction is set to equal to the length of a normal taking-out area or normal insertion area in the particular direction.

21. The method according to claim 19, wherein a difference between the initial stop position and one of the updated stop positions in a particular direction is set to the half of the length of a normal taking-out area or normal insertion area in the particular direction.

* * * * *